United States Patent
Haimer

(10) Patent No.: US 7,217,072 B1
(45) Date of Patent: May 15, 2007

(54) TOOL HOLDER FOR A TOOL, ESPECIALLY A BORING, MILLING OR RUBBING TOOL, WHICH CAN BE ROTATED ABOUT A ROTATIONAL AXIS

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 140 days.

(21) Appl. No.: 10/332,973

(22) PCT Filed: Jul. 14, 2000

(86) PCT No.: PCT/EP00/06760

§ 371 (c)(1),
(2), (4) Date: Aug. 7, 2003

(87) PCT Pub. No.: WO02/05992

PCT Pub. Date: Jan. 24, 2002

(51) Int. Cl.
*B23B 51/14* (2006.01)
*B23B 31/00* (2006.01)

(52) U.S. Cl. .................. 409/234; 29/447; 408/240; 279/9.1

(58) Field of Classification Search ................ 409/234; 29/243, 447, 446, 450, 508, 517; 279/103, 279/145, 139, 4.03, 4.05, 4.06, 9.1; 408/56, 408/240, 239 A
See application file for complete search history.

(56) References Cited

U.S. PATENT DOCUMENTS

| | | | | |
|---|---|---|---|---|
| 4,630,980 A | * | 12/1986 | Kubo | ................... 409/234 |
| 4,721,423 A | * | 1/1988 | Kubo | ................... 409/234 |
| 4,809,426 A | * | 3/1989 | Takeuchi et al. | ............... 483/8 |
| 4,856,177 A | * | 8/1989 | Takeuchi et al. | ............... 483/9 |
| 5,311,654 A | * | 5/1994 | Cook | ................... 29/447 |
| 6,060,694 A | * | 5/2000 | Hauser | ................... 219/221 |
| 6,105,974 A | * | 8/2000 | Matsumoto | ................ 409/234 |

(Continued)

FOREIGN PATENT DOCUMENTS

DE 19708983 A1 * 9/1998

(Continued)

*Primary Examiner*—Danna Ross
(74) *Attorney, Agent, or Firm*—Edwards Angell Palmer & Dodge LLP; Scott D. Wofsy

(57) ABSTRACT

A tool holder for a tool which can be rotated about an axis of rotation, in particular a drilling, milling or reaming tool, comprises a clamping shank which, in an end shank region (7), has an accommodating opening (9) which is central in relation to the axis of rotation and is intended for accommodating a retaining shank of the tool. Clamping surfaces for securing the retaining shank of the tool with a press fit are arranged on the circumferential casing of the accommodating opening. According to the invention, the end shank region (7) of the clamping shank has a plurality of at least more or less axially extending tension spokes (13) distributed in the circumferential direction, it being possible for said tension spokes to be subjected to an essentially radially outwardly directed tensile force in order for the clamping surfaces to be spread apart radially from one another. Acting on the tension spokes (13) are bridge elements (19) which bridge the circumferential spacing between the latter and of which the chord length measured between the points of attachment of the bridge elements to the tension spokes (13) can be increased when the tension spokes (13) are subjected to the action of tensile force.

11 Claims, 8 Drawing Sheets

Figure 3:
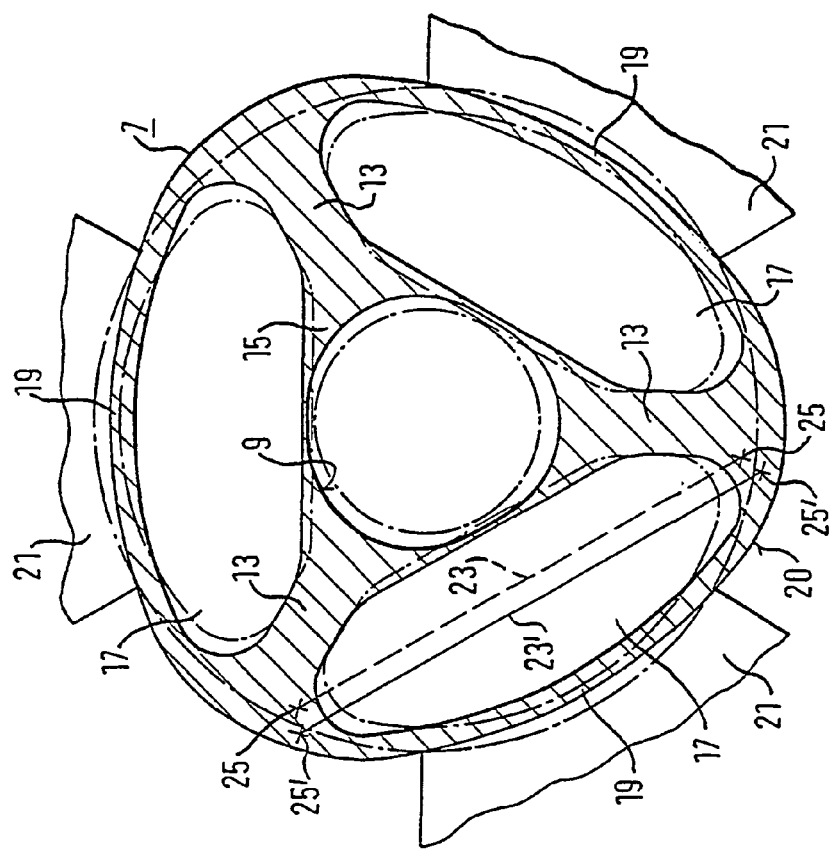

U.S. PATENT DOCUMENTS 6,216,335 B1 * 4/2001 Freyermuth .................. 29/701

FOREIGN PATENT DOCUMENTS

| DE | 198 34 739 C1 | | 3/2000 |
| DE | 198 27109 C1 | | 3/2000 |
| DE | 19928995 A1 | * | 12/2000 |
| EP | 566898 A2 | * | 10/1993 |
| EP | 1 084 782 A1 | | 3/2001 |
| EP | 0 662 023 B1 | | 12/2001 |
| WO | WO 99/65643 | | 12/1999 |
| WO | WO 01/19558 A1 | | 3/2001 |

* cited by examiner

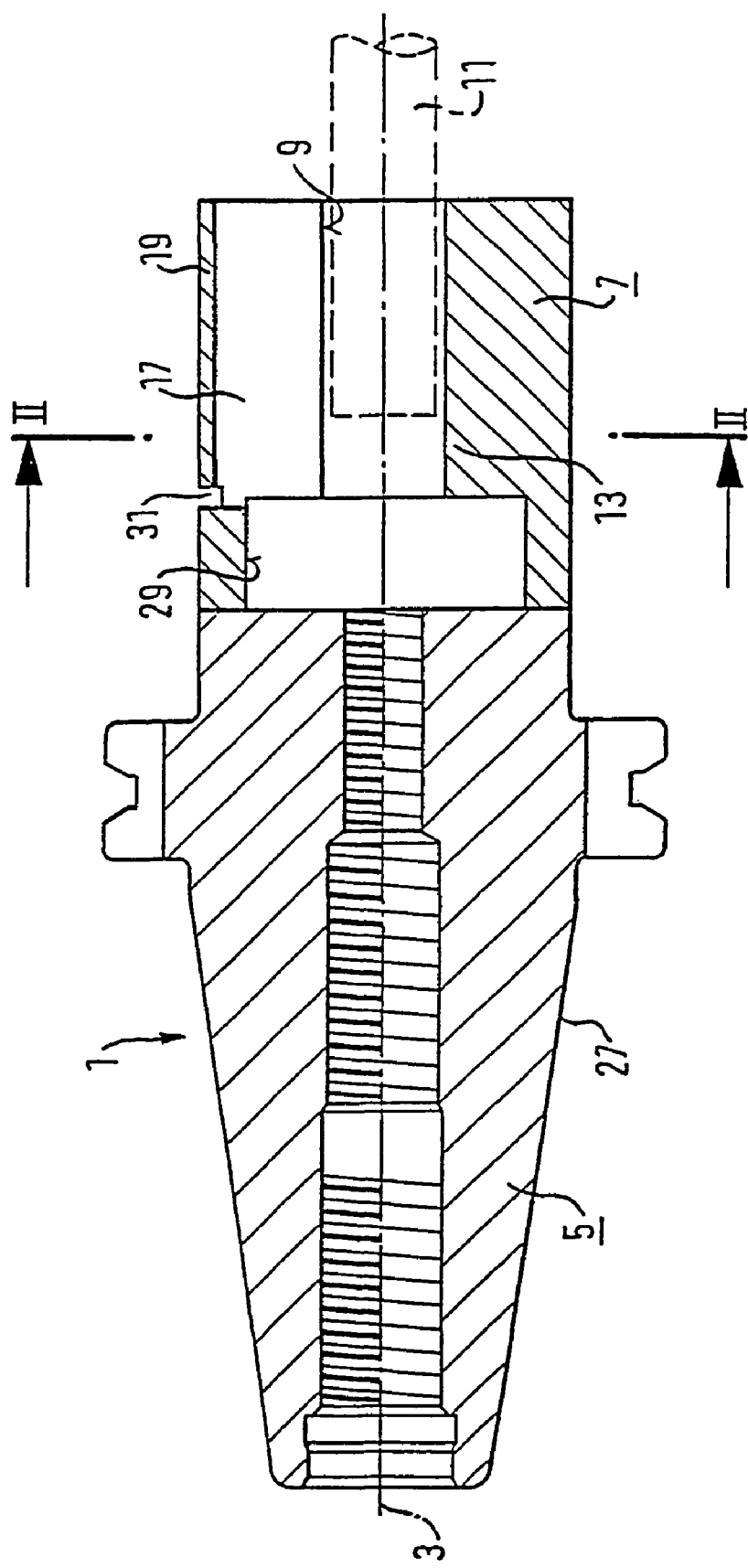

US 7,217,072 B1

TOOL HOLDER FOR A TOOL, ESPECIALLY A BORING, MILLING OR RUBBING TOOL, WHICH CAN BE ROTATED ABOUT A ROTATIONAL AXIS

The invention relates to a tool holder for a tool which can be rotated about an axis of rotation, in particular a drilling, milling or reaming tool.

In the case of rotating high-precision tools, e.g. drills or milling cutters, a high level of running truth is necessary in order avoid uneven cutting on the cutting edges of the tool. In order for such tools to be clamped in such that they run true, Schunk GmbH & Co. KG has provided a tool holder which is sold under the name "Tribos" and, in an annularly closed end sleeve of a clamping shank, has an accommodating opening which is central in relation to the axis of rotation and is intended for accommodating a retaining shank of the tool. The accommodating opening has a polygonal cross-sectional shape, on the polygon sides of which the inner circumferential casing of the end sleeve has clamping surfaces for securing the retaining shank with a press fit. In order to insert or remove the tool, a radially inwardly directed compressive force is applied to the end sleeve in the corner regions of the polygon and changes the cross section of the accommodating opening into a circular shape which eliminates the press fit. There is essentially no increase in cross section of the accommodating opening here. Rather, the cross section is essentially just deformed. The retaining shank of the tool can easily be inserted or removed in this state. When the end sleeve is relieved of loading by the compressive force, the accommodating opening returns to its polygonal cross-sectional shape again.

The solution provided by Schunk, the functioning of which is explained, for example, in a "Tribos-Power Shrinking" catalog from Fritz Schunk GmbH & Co. KG, Catalog No. 9901074-7, 5M-9/98, is dependent on a polygonal cross-sectional shape of the accommodating opening being provided. This is acceptable provided that the requirements which have to be met by the clamping force by which the tool is clamped in the tool holder are not overly stringent. This is because, in the case of the solution provided by Schunk, the tool is only clamped in the region of the polygon sides. In the corner regions of the polygon, the inner circumferential surface of the end sleeve is spaced apart radially from the retaining shank of the tool, for which reason no clamping forces are transmitted here. In a fair number of cases, however, it is desirable for the tool to be clamped over the entire circumference of the retaining shank in order for it to be possible for particularly high clamping forces to be transmitted, for example, if it is intended to machine workpieces with a large cutting depth or with high cutting forces. The Schunk tool holder mentioned, on account of its functioning principle, is not suitable for such cases.

Accordingly, the invention is based on the technical problem of providing a tool holder for a rotating tool, in particular a drilling, milling or reaming tool, which can be used widely.

In order to solve this problem, the invention is based on a tool holder for a tool which can be rotated about an axis of rotation, in particular a drilling, milling or reaming tool, comprising a clamping shank which, in an end shank region, has an accommodating opening, which is central in relation to the axis of rotation and is intended for accommodating a retaining shank of the tool, clamping surfaces for securing the retaining shank of the tool with a press fit being arranged on the circumferential casing of the accommodating opening.

The invention provides that the end shank region of the clamping shank has a plurality of tension spokes distributed in the circumferential direction, it being possible for said tension spokes to be subjected to an essentially radially outwardly directed tensile force in order for the clamping surfaces to be spread apart radially from one another, and that acting on the tension spokes are bridge elements which bridge the circumferential spacing between the latter and of which the chord length measured between the points of attachment of the bridge elements to the tension spokes can be increased when the tension spokes are subjected to the action of tensile force.

In the case of such a tool holder, the tension spokes are subjected to tensile loading in order to increase the tool-holder clamping diameter defined by the clamping surfaces and to eliminate the press fit of the retaining shank of the tool—if the latter is clamped in the tool holder. It has been found that such tensile loading of the tension spokes makes it possible to achieve elastic deformation of the clamping shank which is not just associated with deflection of the clamping surfaces in the radially outward direction but, overall, establishes an increase in cross section of the accommodating opening. This functioning principle of the solution according to the invention is not dependent on a specific cross-sectional configuration of the accommodating opening. In particular, it is possible to have a circular accommodating-opening cross section, which allows the retaining shank of the tool to be clamped over the entire circumference and, correspondingly, to transmit high clamping forces. The deformation of the clamping shank which is brought about by tensile loading of the tension spokes is reversible, for which reason, when the tension spokes are relieved of loading, the clamping surfaces return again into their original position, corresponding to the press fitting of the retaining shank of the tool.

Although the accommodating opening of the clamping shank is preferably adapted to the shape of the retaining shank of the tool, and, accordingly, has a conical or cylindrical shape, this does not, in principle, rule out the situation where the accommodating opening—as in the case of the solution provided by Schunk—has a polygonal cross-sectional shape. The clamping shank may be formed directly by a work spindle of a machine tool. It is also possible, however, for it to be a tool holder which can be inserted into the work spindle, for example a steep-taper tool holder or a hollow steep-taper tool holder.

In order to widen the accommodating opening, it is conceivable for the tension spokes to be subjected to tensile loading one after the other, on an individual basis or in groups. On the other hand, the tool can be inserted and removed particularly quickly if all the tension spokes are subjected to tensile loading at the same time. The radial widening of the accommodating opening need not take effect immediately at the same time as the introduction of the tensile force into the tension spokes begins; it can establish itself after a time delay, on account of material elasticity of the clamping shank.

In order for it to be possible for the deformation behavior of the clamping shank to be influenced specifically, it is even conceivable for at least some of the tension spokes to have different cross-sectional shapes and/or cross-sectional sizes.

If the tension spokes are displaced radially outward under tensile loading, the points of attachment of the bridge elements move radially outward at the same time. This causes an increase in the bridge-element chord length measured between the points of attachment. Said bridge elements are configured such that they allow their chord length to be increased in this way.

It is conceivable, in principle, to provide for formations on the clamping shank which allow separate tension-applying bodies, for example, tension rods, to pull on the tension spokes from the outside. However, this would involve comparatively high design-related outlay. It has been found, then, that it is also possible to use the bridge elements in order to introduce tensile forces into the tension spokes. Suitable loading of the bridge elements may give rise to deformation of the clamping shank, as a result of which the tension spokes are pulled radially outward. Accordingly, a development of the invention provides that at least some of the bridge elements and their points of attachment to the tension spokes are configured such that the tension spokes can be subjected to tensile loading by virtue of a chord-lengthening force, in particular in the form of an essentially radially inwardly directed compressive force, being introduced into the bridge elements. The chord-lengthening force introduced into the bridge elements deforms the bridge elements such that tensile reaction forces transmitted from the bridge elements to the tension spokes cause the press fit to be eliminated. This is accompanied by an increase in the chord length of the bridge elements.

As in the case of the tension spokes, it is also conceivable in principle in the case of the bridge elements for at least some of the bridge elements to have different cross-sectional sizes and/or cross-sectional shapes.

A particularly straightforward solution may consist in that at least some of the bridge elements are designed as membranes which are curved concavely in the direction of the axis of rotation and can be flattened membranes are pressed flat, the tension spokes are pulled apart radially from one another, with the press fit being eliminated in the process.

The curvature of the membranes may be smaller than that of a circle arc which is central in relation to the axis of rotation and passes through the points of attachment of the membranes to the tension spokes. This makes it possible to achieve favorable force-transmission conditions between the bridge elements and the tension spokes.

The membranes may be connected integrally to the tension spokes. It is also conceivable, however, for the membranes to be designed as separate insert parts which are retained in captive fashion in accommodating chambers of the end shank region of the clamping shank.

As an alternative to being designed as flexibly deflectable membranes, at least some of the bridge elements may be formed by elastomeric bodies. It has been found that such elastomeric bodies also make it possible to transmit to the tension spokes forces which result in tensile loading of said spokes. It is recommended for the elastomeric bodies to be retained in captive fashion in accommodating chambers of the end shank region of the clamping shank. In particular, they may be produced therein by virtue of a curable filling substance being introduced.

The chord-lengthening force may be applied in different ways to the bridge elements. One possibility consists in the end shank region of the clamping shank containing a pressure-chamber system which, in order for the chord-lengthening force to be introduced into the bridge elements, can be connected to an in particular hydraulic pressure-medium supply. The pressure chambers of the pressure-chamber system are expanded by the pressure medium. This expansion brings about elastic deformation of the pressure-chamber-bounding material regions of the clamping shank, which can be utilized for subjecting the bridge elements to loading. The expansion of the pressure chambers can be utilized particularly effectively if the pressure-chamber system is bounded at least in part by the bridge elements.

As an alternative, or in addition, the clamping shank may bear attachment surfaces for pressure-exerting bodies which can be separated from the clamping shank and by means of which, in order to produce the chord-lengthening force, compressive forces can be introduced into the clamping shank. It is possible here for the attachment surfaces to be arranged directly on the bridge elements. If the bridge elements are designed as insert or introduction parts which are retained in captive fashion in accommodating chambers of the end shank region of the clamping shank, the accommodating chambers may be open in the radially outward direction as a result of slots, through which the pressure-exerting bodies can be introduced and brought into engagement with the bridge elements.

It is also conceivable, however, for the end shank region of the clamping shank to have a force-introduction ring which encloses the bridge elements in the radially outward direction, is connected in particular integrally to the bridge elements by radial pressure webs and bears the attachment surfaces. The attachment surfaces may be formed over large surface areas of the force-introduction ring, with the result that the surface pressure between the force-introduction ring and the pressure-exerting bodies can be kept low. By virtue of the pressure webs, the compressive force introduced via the pressure-exerting bodies can be concentrated and introduced into the bridge elements at those locations which are most favorable for the compressive force introduced being converted optimally into tensile loading of the tension spokes. Good results have been achieved, in particular, if the pressure webs are arranged more or less centrally, as seen in the circumferential direction, between adjacent tension spokes.

Although there is no limit to the number of tension spokes, three, four or five circumferentially distributed tension spokes have proven favorable in those embodiments in which the tensile loading of the tension spokes is achieved by the introduction of force into the bridge elements.

As an alternative to the introduction of force into the bridge elements, it is possible to achieve the desired tensile loading of the tension spokes by producing mechanical thermal stresses in the clamping shank. Accordingly, another development of the invention provides that the bridge elements are part of a tension ring which encloses the tension spokes and is connected in particular integrally thereto in a tension-resistant manner, and that the tool holder is assigned a heating device by means of which the tension ring can be thermally widened in the radial direction in order to subject the tension spokes to tensile loading. It has been found that rapid heating of the tension ring for a short period of time results in the occurrence of radial temperature differences, and consequently mechanical thermal stresses between the tension ring and the tension spokes, which pull the tension spokes in the radially outward direction and bring about an increase in diameter of the accommodating opening. The introduction of heat by the heating device can take place uniformly over the entire circumference of the clamping shank. It is also conceivable for the introduction of heat to be concentrated locally, in particular, predominantly on the regions between the tension spokes.

The resulting tensile forces to which the tension spokes are subjected are particularly pronounced if thermal barriers prevent, or at least limit, the heating of radially inner regions of the clamping shank. In order to inhibit the flow of heat to the radially inner regions of the clamping shank, regions of the tension ring which are located circumferentially between at least some of the tension spokes are thermally separated from radially inner regions of the end shank region of the clamping shank by insulating the chambers. In order to achieve additional cooling, it is even possible for the insulating chambers to be filled with a coolant, or for a forced air flow to be produced therein, at least when the tool is inserted or removed.

The operation of the clamping surfaces being spread apart radially from one another may be facilitated in that a radially inner circumferential region of the clamping shank, said region forming the clamping surfaces, is divided up into a plurality of separate circumferential segments, of which each is connected to at least one tension spoke in each case.

The end shank region of the clamping shank may be formed in a straightforward manner in design terms by an annularly closed, in particular single piece end sleeve, of which the inner circumferential casing forms the clamping surfaces. In order to form the tension spokes, distributed in the circumferential direction, a plurality of at least more or less axially extending cutouts, which are in particular closed radially in relation to the outer circumferential casing of the end sleeve, may be made in the latter. The tension spokes are then formed by the material webs of the end sleeves which remain between the cutouts in the circumferential direction.

The tension spokes are particularly straightforward to form in the end sleeve if the end sleeve is produced separately from a base body of the clamping shank and is firmly connected thereto. It is thus possible to machine the end sleeve from both axial end sides.

Centrifugal forces occur during rotational operation of the tool holder. These forces, by their very nature, act on all the regions of the clamping shank, that is to say also on the tension spokes and bridge elements. The centrifugal forces try to displace the tension spokes in the radially outward direction, as a result of which the accommodating opening would widen radially. This may result in the risk of the press fit of the retaining shank of the tool in the accommodating opening being weakened by centrifugal force and in the tool, in the worst-case scenario, even being lost. It has been found then that, in the case of the solution according to the invention, the bridge elements, if configured in a suitable manner, can counteract such weakening of the clamping of the retaining shank of the tool. This is because it is possible to configure the bridge elements such that, during rotational operation of the tool holder, they subject the tension spokes to compressive forces which compensate at least in part for the tension spokes trying to move radially outward. Even over-compensation is possible, with the effect of the press fit of the retaining shank of the tool being enhanced as a result of centrifugal force. Accordingly, a further development of the invention provides that the bridge elements are designed as centrifugal-weight elements which, when the clamping shank rotates about the axis of rotation, under the influence of centrifugal force, subject the tension spokes to an essentially radially inwardly directed compressive force which counteracts the centrifugal tendency of the tension spokes. It is conceivable here, in particular, for the centrifugal-weight elements to be designed such that, when the clamping shank rotates about the axis of rotation, under the influence of centrifugal force, they subject the tension spokes to a compressive force which enhances the press fit of the retaining shank of the tool. The centrifugal-weight elements may be configured, for example, such that they are subjected to particularly high centrifugal forces in their region located more or less centrally between the tension spokes, for example as a result of them having thickened portions or bearing additional weights there.

The at least partial compensation for the centrifugal tendency of the tension spokes by the bridge elements is conceivable not just in those embodiments which are based on the principle of the external introduction of force into the bridge elements, but also in those embodiments in which the accommodating opening can be thermally widened.

Figure 2:
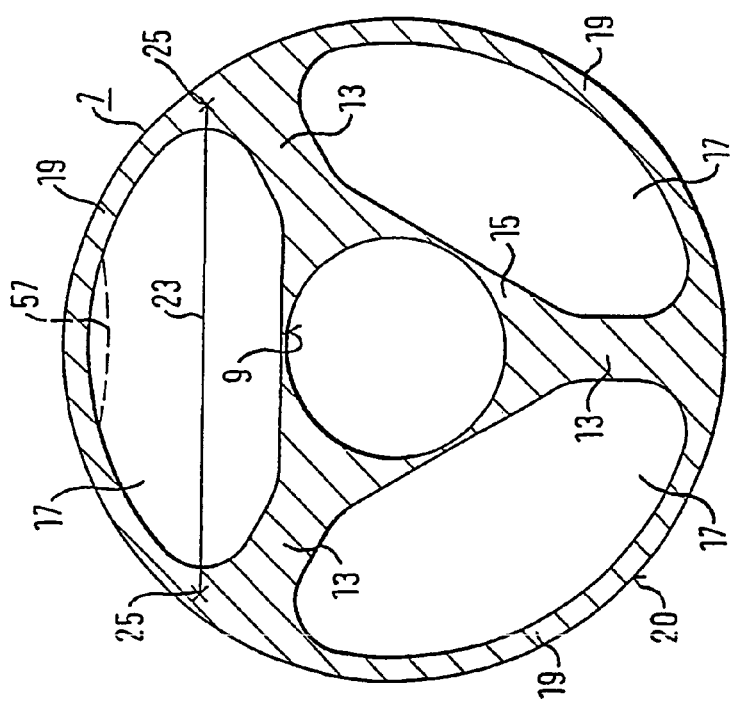
Figure 5:
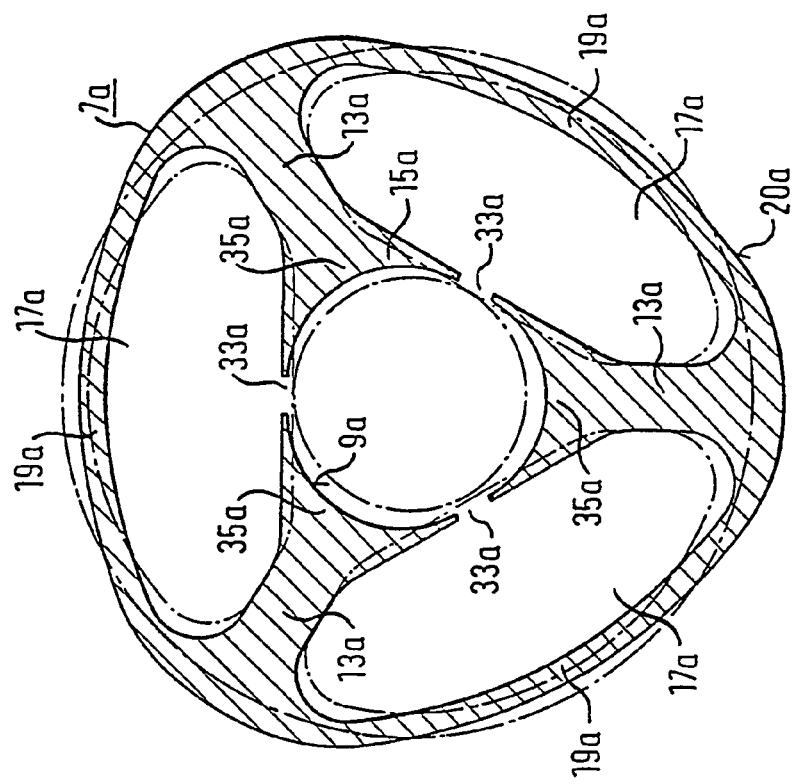
Figure 4:
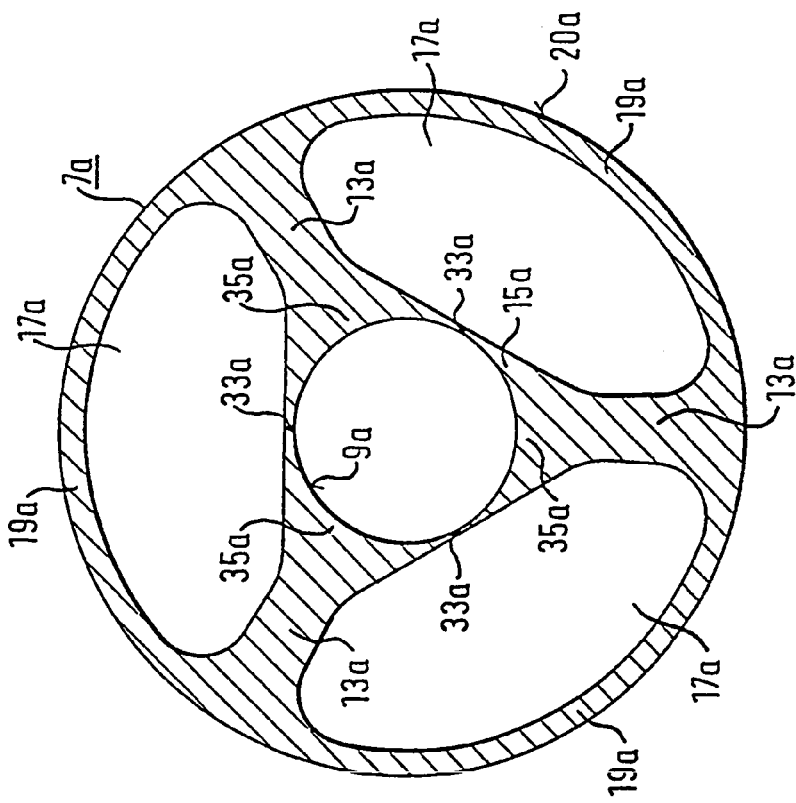

The invention is explained in more detail hereinbelow, with reference to the attached drawing, in which:

FIG. 1 shows an axial longitudinal section through an embodiment of the tool holder according to the invention, FIG. 2 shows an axial cross section along line II—II from FIG. 1 in the normal state of the tool holder, FIG. 3 shows a view corresponding to FIG. 2, but with the tool holder subjected to compressive loading, FIGS. 4 and 5 show cross-sectional views similar to FIGS. 2 and 3 in the case of a variant of the tool holder according to the invention, and FIGS. 6–16 show cross-sectional views similar to FIG. 2, in the case of further variants of the tool holder according to the invention.

FIGS. 1 to 3 show a steep-taper tool holder with a clamping shank 1 which, at an end remote from the tool, has a steep taper 5 which is central in relation to its axis of rotation 3 and by means of which it can be inserted in a rotationally fixed manner into a complementary steep-taper mount of a work spindle (not illustrated) of a machine tool, said work spindle rotating equiaxially with the axis of rotation 3. At an end which is in the vicinity of the tool, the clamping shank 1 is configured with an annularly closed end sleeve 7 which contains an accommodating opening 9 which is central in relation to the axis of rotation 3 and is intended for securing a retaining shank 11 (indicated by dashed lines) of a rotating tool, in particular of a drilling or milling tool, with a press fit. The retaining shank 11 may be of cylindrical or conical design; the end sleeve 7 has a complementary inner-casing shape with fitting dimensions by means of which that region of the retaining shank 11 which engages in the accommodating opening 9 is retained in the press fit.

In order for it to be possible for the retaining shank 11 to be removed from the accommodating opening 9, or introduced into the same, the end sleeve 7 has a plurality of, in the example illustrated three, approximately axially extending tension spokes 13, distributed uniformly in the circumferential direction, said tension spokes, as seen in an axis-normal section, extending essentially radially and merging integrally, in the radially inward direction, into an annularly closed sleeve region 15 which bounds the accommodating opening 9 by way of its inner circumferential casing. As is explained hereinbelow, by virtue of radial tensile loading of the tension spokes 13, the sleeve region 15 and thus the diameter of the accommodating opening 9 can be widened radially to the extent where the retaining shank 11 of the tool can be freed from its press fit and removed from the accommodating opening 9 or plugged into the same.

As can be seen in FIGS. 2 and 3 in particular, a plurality of hollow chambers 17 are made approximately axially in the end sleeve 7 in order to form the tension spokes 13, the latter being formed by the material webs which remain between the hollow chambers 17 in the circumferential direction. The hollow chambers 17, which in axial cross section are enclosed fully by the material of the end sleeve 7, are bounded in the radially outward direction by membrane-like bridge elements 19 which are curved in the form of circle arcs and each bridge the circumferential spacing between pairs of adjacent tension spokes 13. They are part of a radially outer annular region 20 of the end sleeve 7, and the tension spokes 13 merge integrally into said annular region. The bridge elements 19 can be deflected in a flexible manner in the radially inward direction. The bridge elements 19 are flattened by being subjected to a radially inwardly directed compressive force. This produces, in the tension spokes 13, forces which contain a radially outwardly directed component which pulls on the tension spokes 13. This tensile loading of the tension spokes 13 results in the accommodating opening 9 widening radially.

FIG. 2 shows the conditions before a compressive force is applied to the bridge elements 19. The accommodating opening 9 here has a diameter which makes the press fit of the rotating shank 11 possible. In order to increase the diameter of the accommodating opening 9, the bridge elements 19 are subjected to the compressive loading mentioned. FIG. 3 shows clamping jaws 21 which, for this purpose, are advanced up against the bridge elements 19 from the radially outward direction and belong to a clamping arrangement (not illustrated any more specifically) into which the tool holder is clamped for the insertion and removal of the tool. As the bridge elements 19 are pressed flat, the outer circumferential casing of the end sleeve 7 assumes a more or less polygonal cross-sectional shape.

The tension spokes 13 here are pulled radially outward, with the result that the radially inner sleeve region 15 widens radially by an extent which eliminates the press fitting. This state of deformation of the end sleeve 7 is shown by solid lines in FIG. 3. The chain-dotted lines in this figure depict the original contour of the non-deformed end sleeve 7 clamping the tool in the press fit. The radial widening of the accommodating opening 9 varies, in practice, for example in the order of magnitude of a few 10 μm, which is enough to eliminate the press fitting. For illustrative reasons, the difference between the non-deformed end sleeve and deformed end sleeve is illustrated in exaggerated form in FIG. 3. When the bridge elements 19 are subjected to compressive loading, the end sleeve 7 deforms elastically, for which reason, when the clamping jaws 21 move back, the end sleeve 7 returns into its original state and the radially inner sleeve region 15 narrows to its original extent again.

The bridge elements 19 may each be assigned a chord which extends between the regions where the respective bridge element 19 is connected to the associated tension spokes 13. FIG. 2 depicts such a chord for the top bridge element 19 there. The chord is designated 23. It connects two virtual points of attachment 25 of the bridge elements 19 to the associated tension spokes 13. It goes without saying that, on account of the bridge elements 19 merging integrally into the tension spokes 13, it is not possible to specify any clearly localized points of attachment of the bridge elements 19 to the tension spokes 13, but rather that an attachment region forms the basis here. For the sake of simplicity, however, FIG. 2 shows the idealized case of two defined points of attachment 25.

If the bridge elements 19, as a result of being subjected to loading by the clamping jaws 21, stretch out flat, and the tension spokes 13 thus move radially outward, the points of attachment 25 are displaced radially outward at the same time. FIG. 3 depicts the displaced points of attachment and the chord drawn out between them. They are respectively designated 25' and 23' there. For comparison, moreover, dashed lines depict the chord 23, with its points of attachment 25, which is obtained in the non-deformed state of the end sleeve 7. It can be seen that the radial widening of the accommodating opening 9 is accompanied by an increase in the chord length. This lengthening of the chord is characteristic of the deformation operation of the end sleeve 7, which results in the press fit being eliminated.

In order for the tension spokes 13 and the bridge elements 19 to be formed more easily, the end sleeve 7 is a separately produced component in which the hollow chambers 17 can be made, for example, by drilling or erosion, from one or both axial sides. The end sleeve 7 prepared in this way is firmly connected, for example, by friction welding, to a basic body 27 of the clamping shank 1. In its axial end region which is remote from the tool, the end sleeve 7 may additionally have a recess 29 which increases the internal diameter and makes it easier for the end sleeve 7 to be machined in the radially inner region. In order to increase the flexibility of the membranes 19, it is also possible for cut-out slots 31 to be made in the end sleeve 7 at an axial spacing from the sleeve end which is in the vicinity of the tool, said slots running circumferentially along the membranes 19. The membranes 19 are thus freely movable at both their axial edges.

The rest of the figures show variants in which identical or equivalent components are provided with the same designations as in FIGS. 1 to 3, albeit supplemented by a lower-case letter. In order to avoid repetition, it is essentially only the differences from the previously described exemplary embodiment which will be discussed hereinbelow.

FIGS. 4 and 5 show a variant which merely differs from the previously explained exemplary embodiment in that the radially inner sleeve region 15a is subdivided into a plurality of circumferential segments 35a by a plurality of separating cuts 33a in its thin-walled region between the hollow chambers 17a and the accommodating opening 9a. Each of the circumferential segments 35a hangs on one of the tension spokes 13a in each case. By virtue of the separating cuts 33a, the tension spokes 13a are separated mechanically from one another in the radially inward direction. This means that the accommodating opening 9a can be widened by a relatively small application of force. While FIG. 4 shows the non-loaded state of the end sleeve 7a, in which the segments 35a can butt against one another in the region of the separating cuts 33a, FIG. 5 shows the deformed state of the end sleeve 7 with the widened accommodating opening 9a. In this state, the separating cuts 33a have widened to form comparatively large gaps.

Figure 6:
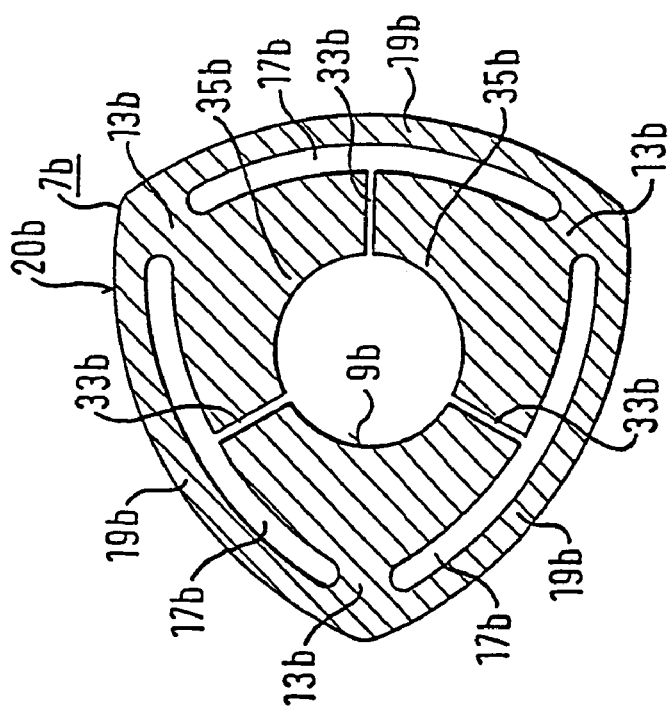

FIG. 6 shows a variant in which the end sleeve 7b has a non-circular outer circumferential contour even in the non-deformed state. It has a more or less polygonal cross section with three corner regions, the membranes 19b being located in the region of the polygon sides. The curvature of the membranes 19b is smaller than that of the previous exemplary embodiments. The slightly flattened shape of the membranes 19b results in particularly favorable force conditions in respect of the forces which are introduced into the membranes 19b being converted into tensile loading of the tension spokes 13b.

In the variant of FIG. 6, the hollow chambers 17b are designed as slots which are curved in a banana-like manner and are elongate in the circumferential direction. Compressive loading of the membranes 19b, however, makes it possible to subject the tension spokes 13b and the radially inner circumferential segments 35b to the same tensile action as in the case of the above exemplary embodiments.

Figure 7:
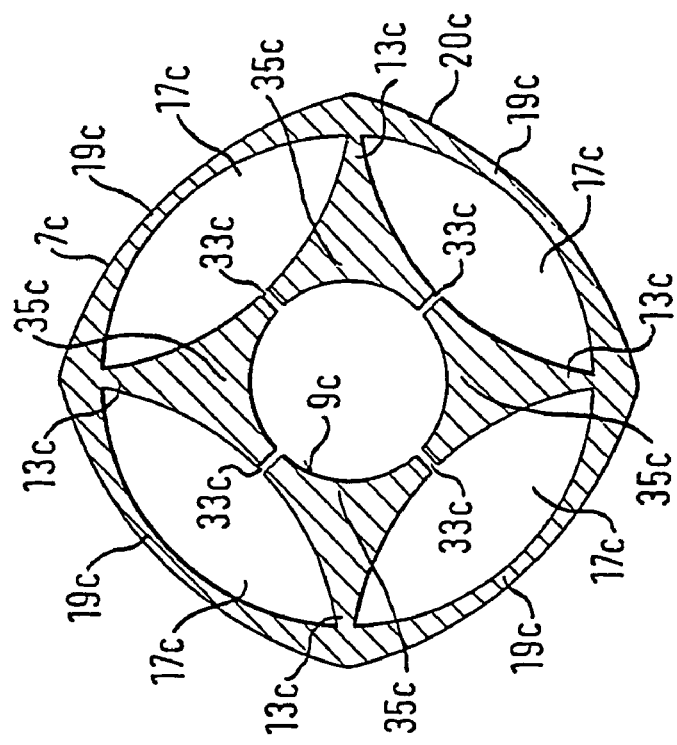

FIG. 7 shows a variant with four tension spokes 13c distributed in the circumferential direction. Correspondingly, four membranes 19c are also provided. As in the exemplary embodiment of FIG. 6, the membranes 19c are curved to a lesser extent than an imaginary circle line which encloses the tension spokes 13c centrally in relation to the axis of rotation.

Figure 8:
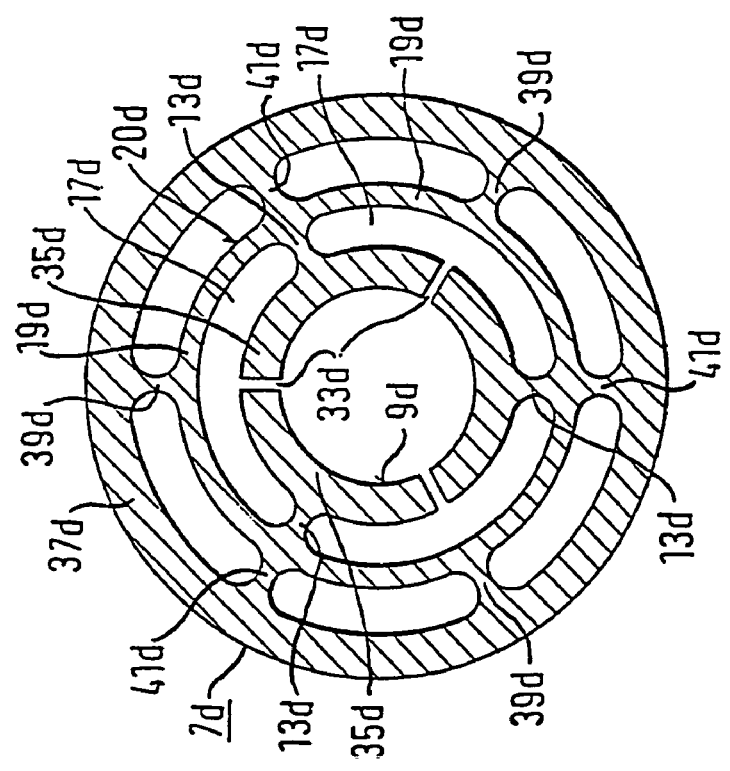

FIG. 8 shows a variant in which the end sleeve 7d, as an integral constituent part, has a further annular region 37d, which encloses the annular region 20d at a radial spacing therefrom. The two annular regions 20d, 37d are connected to one another by pressure webs 39d which act essentially centrally, as seen in the circumferential direction, on the membranes 19d. In radial extension of the tension spokes 13d, further connecting rods 41d are provided between the annular region 37d and the annular region 20d. In order to widen the accommodating opening radially, the annular region 37d is compressed in the circumferential region of the pressure web 39d, for example by means of clamping jaws, as are shown in FIG. 3. The annular regions 37d may be subjected to loading here over a comparatively large surface area, in order to keep the surface pressure within admissible limits. The pressure webs 39d cause the force introduced to be focused on the central regions, as seen in the circumferential direction, of the membranes 19d. This results in the forces introduced being distributed uniformly over the pair of tension spokes 13d connected to the membranes 19d in each case, even when the clamping jaws are not pressed against the outer ring 37d in a centered manner in relation to the pressure webs 39d.

Figure 9:
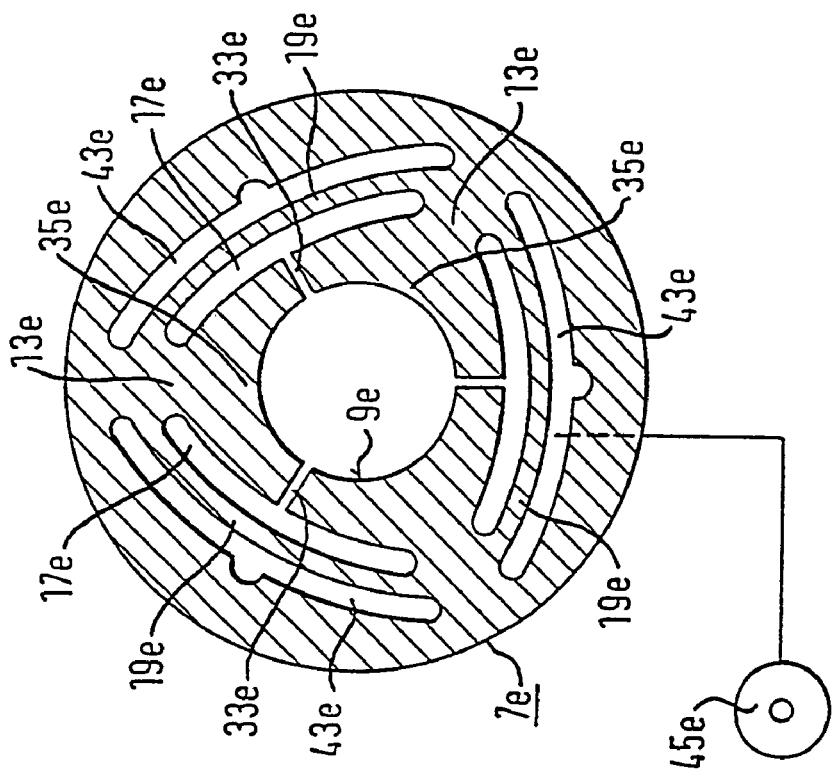

In the variant of FIG. 9, in order for force to be introduced into the membranes 19e, the end sleeve 7e contains an internal system of pressure chambers 43e, which are connected to a usually hydraulic pressure-medium source 45e. In order for the pressure chambers 43e to be connected to the pressure-medium source 45e, an annularly closed distributor channel may be formed in the axial connecting region between the end sleeve 7e and the basic body of the clamping shank (see FIG. 1), said distributor channel communicating with the pressure chambers 43e and leading to a pressure-medium input connection of the pumping shank, to which the pressure-medium source 45e can be connected. Other configurations of the pressure-medium feed, of course, are also conceivable.

The pressure chambers 43e are directly adjacent to the membranes 19e in the radially outward direction. When pressure medium is introduced into the pressure chambers 43e, the latter expand essentially in the radial direction, as a result of which the membranes 19e are flattened in the radially inward direction and subject the tension spokes 13e to the tensile loading which has already been explained in detail.

Figure 10:
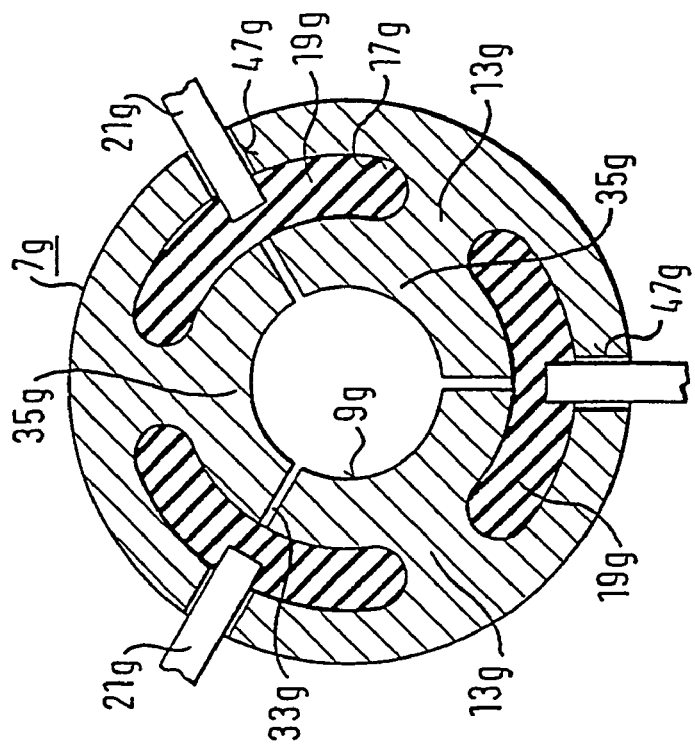

The variant of FIG. 10 provides membranes 19f which, rather than being an integral constituent part of the end sleeve 7f, are designed as separate introduction parts which are inserted into the hollow chambers 17f of the end sleeve 7f. The membranes 19f are formed, for example, by spring-steel elements which are supported on the circumferentially opposite edge regions of the hollow chambers 17f. The hollow chambers 17f are accessible from the radially outer direction through through-passages 47f, which continue from the outer circumferential casing of the end sleeve 7b as far as the hollow chambers 17f. Rams 21f can be introduced through these through-passages 47f and can press the spring-steel membranes 19f radially inward in order to widen the accommodating opening 9f.

Figure 11:
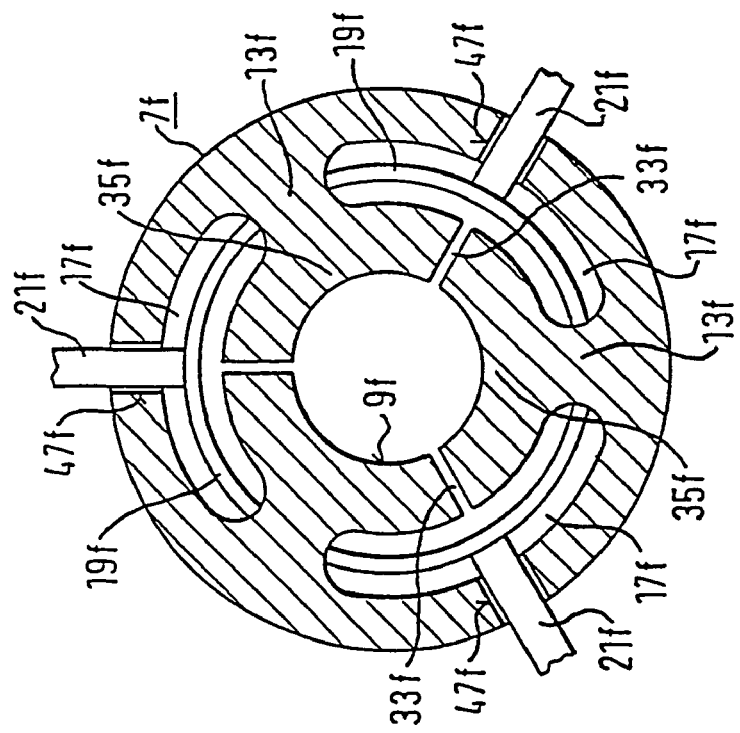

FIG. 11 shows a variant which differs from the above exemplary embodiments in that the bridge elements provided, rather than being thin-walled membranes, are elastomeric bodies 19g, for example made of hard rubber, which are accommodated in the chambers 17g of the end sleeve 7g. The elastomeric bodies 19g may be prefabricated and pressed into the chambers 17g. However, they are preferably produced in the chambers 17g by filling the latter.

It is also the case in the exemplary embodiment of FIG. 11 that the accommodating opening 9g can be widened radially by virtue of rams 21g being pushed into the elastomeric bodies 19g. The elastomeric bodies 19g, which are compressed centrally by the rams 21g, try to avoid this compressive loading by expanding in the circumferential direction. In this case, they subject the circumferentially opposite wall regions of the chambers 17g to forces which, with suitable shaping of the elastomeric bodies 19g and of the chambers 17g, result in tensile loading of the tension spokes 13g.

FIGS. 12 to 16 show variants in which, rather than the tension spokes being pulled radially outward by the external introduction of force into the bridge elements, the accommodating opening is widened thermally by the introduction of heat into the end sleeve. For this purpose, FIG. 12 indicates, schematically, a heating device 49h which rapidly, and for a short time, introduces such a quantity of heat into a comparatively thick-walled annular region 20h of the end sleeve 7h, said annular region forming the outer circumferential casing of the end sleeve 7h, that mechanical thermal stresses are produced in the end sleeve 7h, these stresses pulling the tension spokes 13h radially outward. The heating device 49a can introduce heat into the end sleeve 7h such that it is distributed uniformly over the circumference of the same. It may also be sufficient if the heating device 49h limits its introduction of heat essentially to those circumferential regions of the end sleeve 7h which are located between the tension spokes 13h. Accordingly, FIG. 12 indicates heating nozzles 53h which are spaced apart from one another around the end sleeve 7h. The heating nozzles 53h may expel, for example, warm air or hot steam. It is, of course, possible to make use of other heating subassemblies, for example induction coils, instead of such heating nozzles.

The hollow chambers 17h ensure thermal insulation of the annular region 20h in relation to the radially inner regions of the end sleeve 7h, with the result that these radially inner regions of the inner sleeve 7h are well protected against heating and correspondingly large mechanical thermal stresses may be produced. The insulating action of the hollow chambers 17h may even be assisted by a coolant filling or by cooling air circulation in the hollow chambers 17h.

The thermally induced widening of the end sleeve 7h is also reversible. Once the introduction of heat has been completed, the accommodating opening 9h thus narrows again to its press-fitting dimension.

Figure 13:
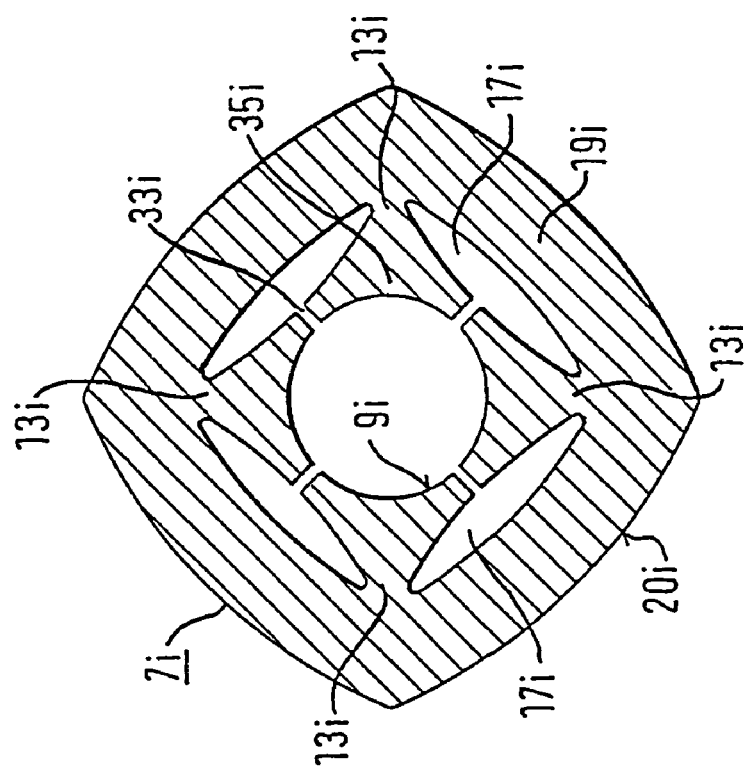
Figure 12:
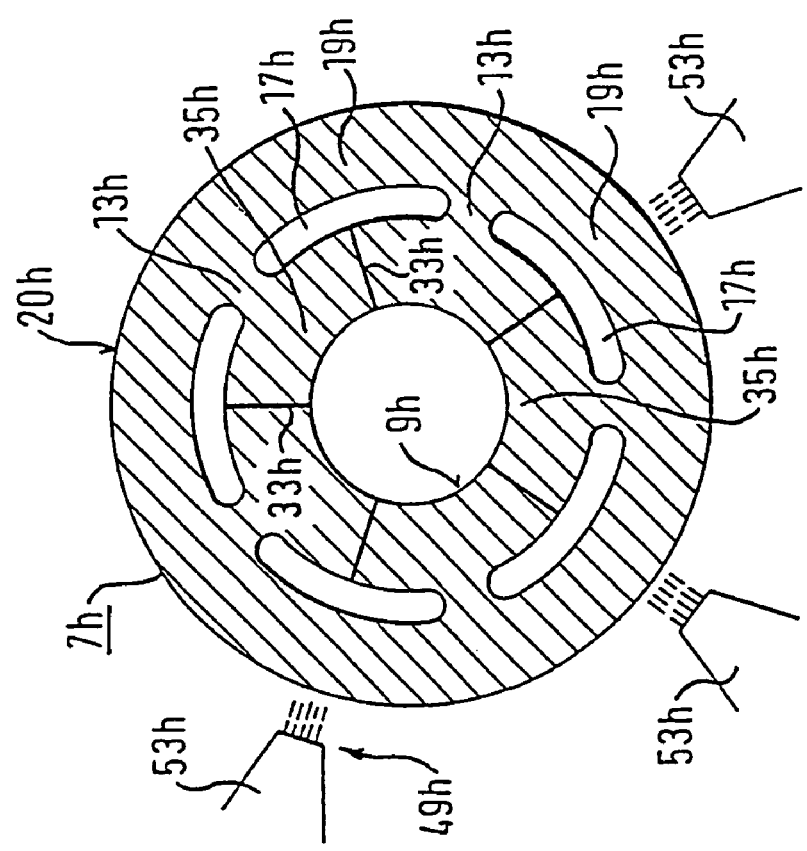

While FIG. 12 shows a variant with a circular outer circumferential contour of the end sleeve 7h and with five tension spokes 13h, FIG. 13 illustrates a variant with a more or less polygonal, that is to say square, outer circumferential contour of the end sleeve 7i and with four tension spokes 13i. The chambers 17i of the exemplary embodiment of FIG. 13, as seen in an axis-normal cross section, are designed as elongate, expediently oval slots which are arranged along the polygon sides.

Figure 14:
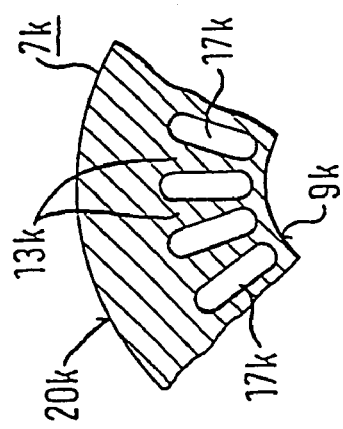

FIG. 14 shows a variant with chambers 17k which, as seen in an axis-normal section, are designed as essentially radially extending elongate slots. A large number of tension spokes 13k, for example between 10 and 20, are formed here.

Figure 15:
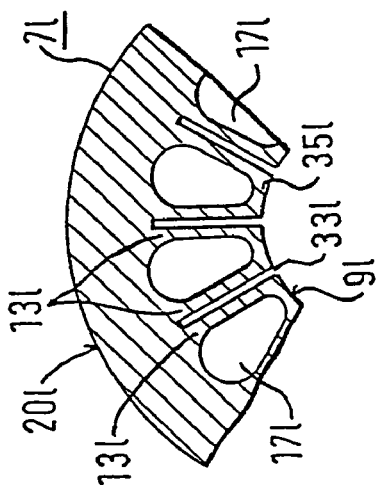

The variants of FIG. 15 have chambers 17l which, as seen in an axis-normal cross section, are designed more or less in the form of an egg and taper radially inward. The separating cuts or slits 33l, which segment the radially inner sleeve region, are arranged between the chambers 17l, as seen in the circumferential direction, and extend radially well into the region between adjacent chambers 17l. This configuration results in two tension spokes 13l, each separated by a separating slit 33l, being formed between each pair of adjacent chambers 171 and in each of the radially inner sleeve segments 351 being connected to two tension spokes 131.

Figure 16:
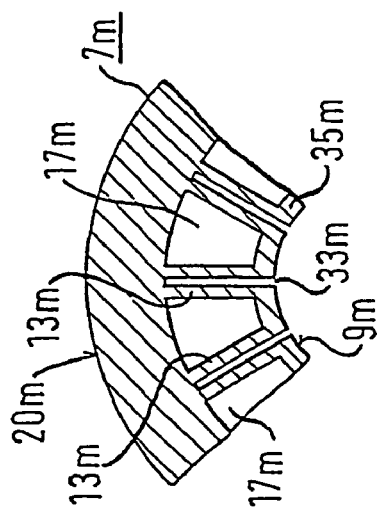

The variant of FIG. 16 corresponds to the exemplary embodiment of FIG. 15 with the exception of the chambers 17m having a radially inwardly tapering, more or less trapezoidal cross section rather than an oval cross section.

In particular, in the case of the membrane solutions of FIGS. 2 to 9, but also—in some circumstances to a lesser extent—in the case of the thermal solutions, the central regions of the bridge elements may move slightly in the radially outward direction as a result of the centrifugal forces occurring during rotational operation of the tool holder, this slight movement resulting in more pronounced curvature of the bridge elements. In contrast to the conditions when the press fit is released, this deformation of the bridge elements results in radially inwardly directed compressive loading of the tension spokes, which eliminates the centrifugal tendency of the tension spokes at least in part. This effect may occur both in the case of end sleeves with a more or less circular outer circumferential contour (as, for example, in FIGS. 2 and 4) and in the case of end sleeves with a more or less polygonal outer circumferential contour (as, for example, in FIGS. 6 and 7). In the latter case, the effect may, in some circumstances, even be enhanced. The effect may, in particular, be so pronounced that the centrifugal tendency of the tension spokes is over-compensated and converted into enhanced pressing of the retaining shank of the tool. The abovementioned movement of the central regions of the bridge elements may be enhanced further by a suitable configuration of the bridge elements. In this respect, you are referred once again to FIG. 2. The latter shows, on the bridge element 19 which is at the top of the illustration, a thickened material portion 57 (indicated by dashed lines) which acts as an additional centrifugal weight and allows particularly pronounced centrifugal forces to be produced in the central region of the bridge element 19. In order to produce such a non-uniform mass distribution of the bridge elements 19, of course, alternatives to the thickened material portion shown are conceivable, for example the provision of a separate weight.

In all of the above embodiments, either the external introduction of force or the external introduction of heat subjects the tension spokes to a tensile action which results in the end sleeve expanding radially and in the press fit being eliminated. The cross-sectional shape of the end sleeve and the configuration of the tension spokes, bridge elements and hollow chambers can be varied greatly. Depending on the configuration of the hollow chambers, it is possible, for example, for the tension spokes to have vastly different lengths and positions in the radial direction. It is likewise possible to vary the number of tension spokes and hollow chambers. In each individual case, the actual configuration of the tool holder will depend, inter alia, on the desired clamping force, on the desired extent of the radial widening of the accommodating opening and on the material of the clamping shank and the deformation properties thereof.

The invention claimed is:

1. A tool system comprising:
   (a) a rotary tool having an axis of rotation and a retaining shank having a first diameter;
   (b) a tool holder having a clamping shank with an end shank region and an accommodating opening in the end shank region for accommodating the retaining shank coaxially to the axis of rotation; wherein the accommodating opening has an essentially circular cross-section with a second diameter less than the first diameter and on its circumferential surface is provided with clamping surfaces for securing the retaining shank with a press fit; wherein the end shank region has an outer circumferential casing and a plurality of tension spokes distributed in the circumferential direction, wherein the tension spokes at their radially outer ends are attached to and bridged by the annular outer circumferential casing and at their radially inner ends are provided with said clamping surfaces;
   (c) heating means for heating the annular outer circumferential casing to pull the tension spokes radially outwardly from a first position in which the cross-section of the accommodating opening is said second diameter to a second position in which the cross-section of the accommodating opening is a third diameter, the third diameter being larger than the first diameter.

2. The tool holder as claimed in claim 1, wherein at least some of the bridge elements and the points of attachment thereof to the tension spokes are configured such that the tension spokes are subjected to tensile loading by virtue of a chord-lengthening force, being introduced into the bridge elements.

3. The tool holder as claimed in claim 2, wherein at least three, and as many as five tension spokes are distributed in the circumferential direction.

4. The tool holder as claimed in claim 2, wherein the chord-lengthening force in the form of an essentially radially inwardly directed compressive force.

5. The tool holder as claimed in claim 1, wherein the bridge elements are part of a tension ring which encloses the tension spokes and is connected thereto in a tension-resistant manner, and wherein the tool holder is assigned a heating device for thermally widening the tension ring in the radial direction in order to subject the tension spokes to tensile loading.

6. The tool holder as claimed in claim 5, wherein regions of the tension ring which are located circumferentially between at least some of the tension spokes are thermally separated from radially inner regions of the end shank region of the clamping shank by insulating chambers.

7. The tool holder as claimed in claim 1, wherein the clamping shank comprises a radially inner circumferential region which forms the clamping surfaces and is divided up into a plurality of separate circumferential segments, each of which is connected to at least one tension spoke.

8. The tool holder as claimed in claim 1, wherein the end shank region of the clamping shank is formed by an annularly closed end sleeve, of which the inner circumferential casing forms the clamping surfaces, and wherein distributed in the circumferential direction, a plurality of at least partly axially extending cutouts are made to from the tension spokes.

9. The tool holder as claimed in claim 8, wherein the end sleeve is produced separately from a basic body of the clamping shank and is connected thereto.

10. The tool holder as claimed in claim 8, wherein the end sleeve is a single-piece end sleeve.

11. The tool holder as claimed in claim 8, wherein the cutouts are closed radially in relation to the outer circumferential casing of the end sleeve.

* * * * *